(12) United States Patent
Dufresne De Virel

(10) Patent No.: US 8,340,371 B2
(45) Date of Patent: Dec. 25, 2012

(54) CONTACTLESS BIODETECTOR

(75) Inventor: Francoise Dufresne De Virel, Paris (FR)

(73) Assignee: Morpho, Paris (FR)

( * ) Notice: Subject to any disclaimer, the term of this patent is extended or adjusted under 35 U.S.C. 154(b) by 858 days.

(21) Appl. No.: 12/280,548

(22) PCT Filed: Feb. 21, 2007

(86) PCT No.: PCT/FR2007/000311
§ 371 (c)(1),
(2), (4) Date: Aug. 22, 2008

(87) PCT Pub. No.: WO2007/096520
PCT Pub. Date: Aug. 30, 2007

(65) Prior Publication Data
US 2009/0046331 A1    Feb. 19, 2009

(30) Foreign Application Priority Data

Feb. 24, 2006   (FR) ...................................... 06 01656

(51) Int. Cl.
*G06K 9/00* (2006.01)
(52) U.S. Cl. ....... 382/126; 382/124; 382/125; 340/5.53; 340/5.83
(58) Field of Classification Search .......... 382/119–126; 340/5.53, 5.83
See application file for complete search history.

(56) References Cited

U.S. PATENT DOCUMENTS

| | | | |
|---|---|---|---|
| 6,898,299 B1 * | 5/2005 | Brooks .......................... | 382/115 |
| 7,031,502 B1 * | 4/2006 | Mil'shtein et al. ............ | 382/126 |
| 2003/0067545 A1 | 4/2003 | Giron et al. | |
| 2003/0156741 A1 | 8/2003 | Lee et al. | |
| 2005/0185827 A1 * | 8/2005 | Kono et al. ................... | 382/124 |
| 2008/0062402 A1 | 3/2008 | Rouget et al. | |
| 2010/0142771 A1 * | 6/2010 | Miura et al. .................. | 382/124 |

FOREIGN PATENT DOCUMENTS

| | | |
|---|---|---|
| CA | 2330115 A1 | 11/1999 |
| DE | 10046406 | 7/2001 |
| EP | 1 241 614 A2 | 9/2002 |
| EP | 1241614 A2 * | 9/2002 |
| EP | 1612714 A2 * | 1/2006 |
| FR | 2849244 A1 | 6/2004 |
| FR | 2849246 A1 | 6/2004 |
| FR | 2861200 A1 | 4/2005 |
| FR | 2862408 A1 | 5/2005 |
| FR | 2872318 A1 | 12/2005 |

OTHER PUBLICATIONS

International Search Report for Application No. PCT/FR2007/000311, mailed Jun. 26, 2007.

* cited by examiner

*Primary Examiner* — Bhavesh Mehta
*Assistant Examiner* — Utpal Shah
(74) *Attorney, Agent, or Firm* — Marshall, Gerstein & Borun LLP

(57) ABSTRACT

A biodetector permits formation of an image of the inner face of the hand or of a finger of a user when the hand or the finger (101) is placed in front of an image-forming device (11), at a defined height (F). The height is adapted such that the biodetection image is sufficiently clear and is indicated to the user by means of a sign (40) projected onto the outer face of the hand or of the finger. Such a biodetector does not require the hand or finger to be applied to a support surface, and it permits intuitive and rapid use of the biodetector.

21 Claims, 3 Drawing Sheets

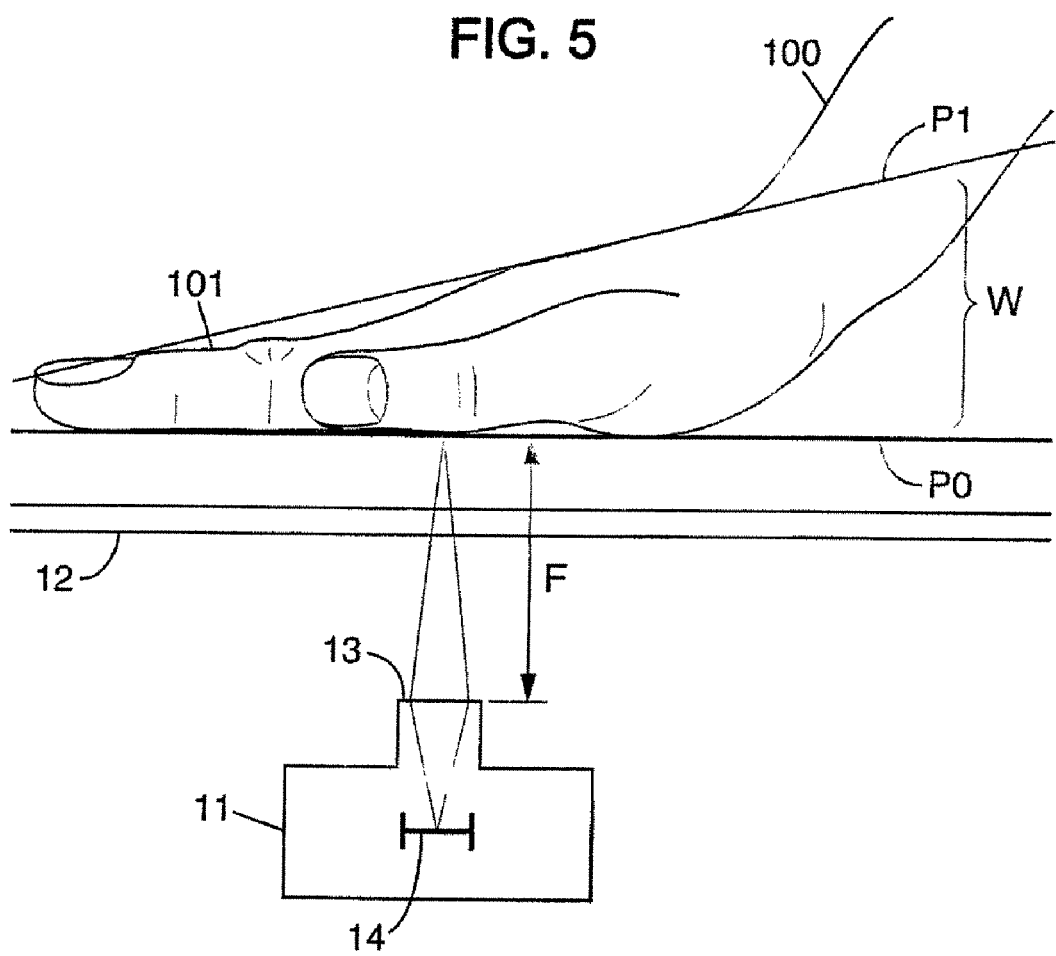

CONTACTLESS BIODETECTOR

The present invention relates to a biodetector operating without contact, or remotely, in other words without the necessity of applying the body that is detected against a contact surface.

Biodetectors exist that use recognition of a palm print of a user, recognition of a contour of the hand, of a geometry of the fingers (length of the phalanges, position of the articulations or of the digital creases, etc.), recognition of a fingerprint or by combination of certain of these processes. For this purpose, an image of the internal face of the hand or of a finger is formed by an image capture device, then the image is analyzed by an image processing system and biodetection data are extracted. These biodetection data are subsequently compared with recognition and/or identification data stored in a database, which may be local or remote.

The image formed must have a high enough resolution to allow the recognition and/or the identification of the user. In particular, in the case of a recognition and/or an identification based on the whole of a hand, and including the capture of fingerprints, a minimum surface area of around $15 \times 22.5$ cm$^2$ must be imaged with a minimum resolution of around 0.1 mm, or even less, in order to obtain a complete image of the hand with the fingers slightly spread out, while at the same time having a sufficiently high resolution for the fingerprints. When a sensor having a detection area of $24 \times 36$ mm$^2$ is used, a magnification of around 1/6.25 is required and the sensor must comprise between 6 and 12 million pixels. The size of a pixel is then around 8.5 μm and the resolution obtained is equal to 50 μm.

Furthermore, the face of the hand or the finger whose image is formed must be situated precisely in an image capture plane, so that the image formed is focused as sharply as possible on the detector. However, the depth of field of the biodetection image formation device depends on the size of the pixels of the detector, on the magnification between the plane of the hand or finger and the image plane at the detector, in addition to the size of the opening of the image formation device. For a given magnification, the larger the opening of the image formation device, the smaller the depth of field. The device is then accordingly more sensitive and a reduced illumination of the hand or of the finger(s) is sufficient.

Usually, a contact surface, such as a glass plate or a prism, is placed in the image capture plane in order to serve as a position reference. Such a contact plate is generally transparent, notably in order to allow the surface of the hand or of the finger whose image is formed to be illuminated, but also in order to allow the sensor to work correctly and, if required, in order to incorporate into this plate fraud detection devices. The capture conditions for a biodetection image are then directly met when the user applies his hand or his finger onto the contact surface. However, such a contact surface gets dirty when it is used, notably by greasy surface skin deposits that are left by each user. As a result, the user is then reticent to use such biodetectors. There are also cultural behaviors where the user tries to avoid surface skin contact with an external surface. The number of users of a contact biodetector is thus reduced, or else some users do not use it properly which can lead to recognition results for individuals that are erroneous. In some circumstances, the reticence which is observed for the use of biodetectors with contact surface leads to such biodetectors not being installed, even though the need for recognition and/or identification of individuals does exist, for example for reasons of security.

It would be possible to ask a user to simply present his hand or his finger in front of an optical window without touching the latter, and the biodetection image capture device would carry out an autofocusing according to the distance between the lens and the hand or finger. Such autofocusing systems do exist, which are for example based on a distance measurement by infrared radiation. However, they are complex, require that the lens of the biodetection image formation device comprise mobile parts and, consequently, are costly. In addition, such autofocusing devices do not encourage the user to present his hand with it fully open or with his fingers fully extended, nor to present it parallel to the image capture plane. For these reasons, the image which is formed can be of low quality, or of quality insufficient to allow recognition or identification of the user.

One object of the present invention consists in providing a biodetector which does not have the drawbacks mentioned hereinabove.

For this purpose, the invention provides a biodetector that makes it possible for the image of a hand or of at least one finger of a user to be recorded, for example for a recognition or identification function for the latter. The biodetector comprises a biodetection image formation device, which is designed for recording the image when a first face of the hand or of the finger is placed substantially within a portion of an image capture plane. This portion of image capture plane is situated within a placement volume for the hand or for the finger which is devoid of any contact surface. The biodetector also comprises a device for projecting two components of a visual sign, which is designed so that this sign is recomposed from the two components in a locating plane substantially parallel to the image capture plane. When the biodetection image is formed, this locating plane is situated at a distance from the image capture plane such that the recomposed sign is visible on a second face of the hand or of the finger opposite the first face.

Optionally, the visual sign may be projected both onto the back of the hand and onto the top of one or more fingers, notably in order to encourage the user to fully open up his hand.

A biodetector according to the invention is therefore of the contactless type, given that the user must place his hand, or his finger, within a volume lacking any contact surface, in the image capture plane. Such a biodetector does not therefore provoke any reticence for a user who might, consciously or unconsciously, be afraid of a surface skin contact with an external surface.

In the absence of any contact surface, the appropriate distance for presentation of the hand or the finger, with respect to the biodetection image formation device, is indicated by a visible sign which is projected onto the hand or the finger(s). Two components of this sign are projected simultaneously onto the back of the hand or of the finger(s). These components only combine constructively in a plane which is situated at a distance from the image capture plane corresponding to the thickness of the hand or of the finger(s). In this way, the user moves his hand forwards and backwards in front of the biodetection image formation device until he sees the sign recomposed on the back of his hand or of his finger(s). Such a biodetector therefore has an intuitive mode of use, which only requires a quick and simple cooperation on the part of the user.

Moreover, it is not necessary for the biodetection image formation device to be equipped with an autofocus lens, given that the user is required to place his hand or his finger(s) at a given fixed position. Such a biodetector can therefore have a simplified design.

The recomposed visual sign, which is projected onto the back of the hand or of the finger(s) in order to indicate the appropriate position to the user, can comprise a pictogram, a geometrical pattern, at least one letter and/or a representation of at least a part of the hand or of the finger(s). This can be a luminous sign such as a circle or the sign "OK", for example. The sign is formed by at least two separate components, which can be different parts of the sign that are superimposed, complement each other or connect together on the back of the hand or of the finger(s) when the latter is in a position that allows the biodetection image to be captured. More generally, the visual sign can be a two-dimensional assembly of graphical, alphanumeric, or spectral elements which are disconnected or grouped within various regions of the locating plane, and whose structure or distribution contains information sensitive to a displacement of the hand in the direction perpendicular to the image capture plane. This set of graphical elements is separated into at least two sub-assemblies that allow, for example by juxtaposition, the complete assembly to be recomposed into a form identifiable by the user, when he moves his hand.

According to one preferred embodiment of the invention, the device for projection of the two components of the visual sign comprises two projection systems designed for respectively projecting the components toward a region of the locating plane in which the visual sign is recomposed. Respective projection directions of these systems are oblique with respect to a direction perpendicular to the image capture plane, and intersect substantially at a point of the locating plane. The two components of the visual sign are then portions of a divided image which appear offset when the hand or the finger is too far forward, or too far back, with respect to the biodetection image formation device, and which appear aligned, superimposed or in a continuous extension of one with respect to the other when the hand or the finger is in the required position for capturing the biodetection image.

According to one improvement of the invention, the biodetector can also comprise a system for adjusting the distance between the image capture plane and the locating plane, this distance being adjusted as a function of a dimension of the hand or of the finger of the user. This dimension of the hand or of the finger of the user can provide an indication of the thickness of this hand or finger. The distance between the image capture plane and locating plane can then be adjusted to the value of this thickness, so that the positioning accuracy of the hand or of the finger of the user, with respect to the image capture plane, is improved.

The invention also relates to a biodetection method, implemented by using a biodetector such as previously described. Such a method can comprise the following steps:

/a/ by the user, placing a hand or a finger in a field of the biodetection image formation device;

/b/ projecting, onto the hand or the finger(s) of the user, on a side opposite the biodetection image formation device, the two components of the visual sign; and /c/ by the user, modifying a height of his hand or of his finger(s) in front of the biodetection image formation device until the visual sign appears recomposed on the face of the hand or finger which is opposite the biodetection image formation device.

Once the visible sign appears recomposed on the face of the hand or of the finger which is opposite the biodetection image formation device, the biodetection image can be recorded, then analyzed in order to obtain a recognition and/or an identification of the user.

Optionally, the method may also comprise the following step, carried out in between the steps /a/ and /b/:

/a1/ adjusting a distance between the image capture plane and the locating plane as a function of a dimension of the hand or of the finger of the user.

When this dimension comprises a width of the hand or of the finger, the method can also comprise the following steps, carried out in between the steps /a/ and /a1/:

/a11/ form a preliminary image of the hand or of the finger of the user by means of the biodetection image formation device;

/a12/ evaluating, from said preliminary image, the width of the hand or of the finger; and /a13/ deriving from this width a thickness value of the hand or of the finger of the user.

The distance between the image capture plane and the locating plane is then adjusted in step /a1/ to the value of the thickness of the hand or of the finger of the user which is deduced in step /a13/. The biodetection image formation device then has the additional function of forming a preliminary image of the hand or of the finger, based on which a width of the latter can be evaluated.

Other features and advantages of the present invention will become apparent in the description hereinafter of several non-limiting exemplary embodiments, presented with reference to the appended drawings, in which:

FIG. 5 illustrates another improvement of the invention.

In these figures, the directions V and A respectively indicate a vertical direction and a direction oriented toward the front of the placement region for the hand or for the finger in the biodetectors shown. The directions G and D are respectively oriented toward the left and toward the right of a user of the biodetectors. Furthermore, the dimensions and positions of the various biodetector parts which are shown are only an indication and do not correspond to actual dimensions or ratios of dimensions. Finally, the invention is described in detail in the context of a fingerprint detector, but it may be easily transposed into a biodetector which is designed to form an image of a part or of the whole of the internal face of the hand, for example when the recognition is based on the palm print, the contour of the hand or the geometry of the fingers.

Figure 1:
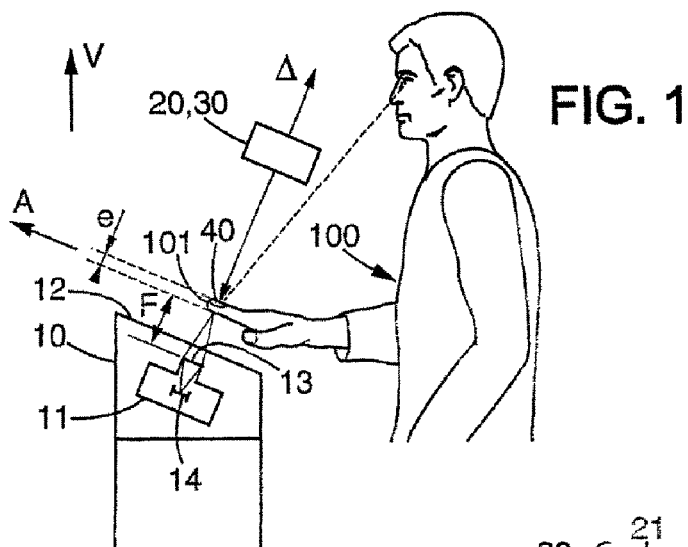
FIG. 1 illustrates in a general way the use of a biodetector according to the invention.

According to FIG. 1, a biodetector comprises a main part 10 and two systems for projection of a visual sign, referenced 20 and 30. The part 10 comprises a device 11 for formation and recording of a biodetection image. The device 11 is placed underneath a transparent optical window 12 and itself comprises a lens 13 and a matrix of photodetectors 14. The transparent window 12 may fulfill a protection function for the lens 13. The lens 13 and the matrix 14 are disposed in such a manner as to form, on the matrix through the window 12, an image of a finger placed at a distance F in front of the lens. The distance F is the focusing distance of the device 11. It is assumed to be fixed in the following part of this description. A denotes the viewing axis of the biodetection image formation device 11.

The matrix 14 may be selected according to the ratio between the dimension of the biodetection image and the desired resolution. It may for example have dimensions 24×36 $mm^2$ and comprise at least 12.5 million pixels. The distance F is optimized in a manner known per se, in order to obtain a magnification compatible with an image that covers a sufficiently large part of the hand or of the finger(s). Typically, a resolution of 50 μm is appropriate for a recognition based on fingerprints.

In order to use the biodetector, a user 100 presents the internal face of his index finger 101 in front of the lens 13, substantially at the distance F from the latter. When his finger 101 is correctly positioned, at distance from the window 12, the systems 20 and 30 form a recomposed sign 40 on the external face, or upper face, of his finger, for example in the region of the nail. If required, the sign could also indicate the location at which the finger must be presented within a plane perpendicular to the axis Δ, in other words in the directions A, G and D.

Preferably, the window 12 and the lens 13 are disposed within the part 10 of the biodetector in such a manner that, when the finger 101 is correctly positioned to allow the capture of a biodetection image, the internal surface of the finger is situated at a reasonably short distance from the window 12. By way of example, this distance may be less than 2 cm, and preferably in the range between 5 mm and 1 cm. In this way, although the user does not touch the window 12, the proximity of the finger 101 to the window 12 is advantageous because it encourages the user to correctly extend his finger, or his hand, and to present it parallel to the window. Thus, a largest part of the finger or of the hand is correctly placed in order to allow the recording of a biodetection image that is of sufficient quality.

The biodetector may also comprise an illumination system (not shown), which is situated so as to illuminate the internal face of the finger 101, in order to obtain a biodetection image with a high enough contrast. Advantageously, the illumination system may be situated within the part 10 of the biodetector and illuminate the finger 101 of the user through the window 12 when the biodetection image is captured. Alternatively, it may be situated on either side of the part 10 of the biodetector, and be associated with suitable light beam steering means in order to illuminate the lower surface of the finger 101. The illumination direction may be inclined with respect to the axis Δ, notably in order to reinforce the contrast of the biodetection image that is captured, for example by a shadowing effect of the skin surface features of the fingerprint.

If required, in order to avoid interference of the biodetection image that is captured by external lights, or for reasons of discretion, the placement volume for the hand above the window 12 may be enclosed, while leaving a free field of view for the user 100 so that he can see the visual sign 40 projected onto his hand or onto his finger.

Figure 2:
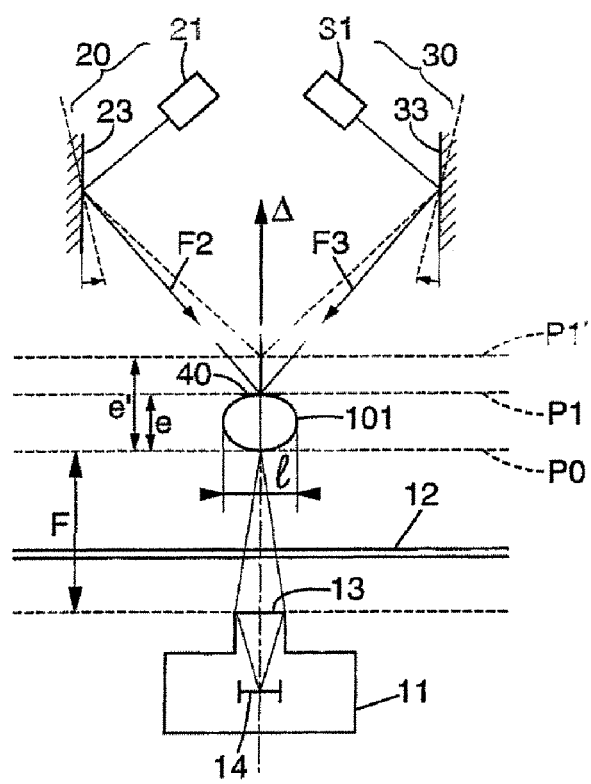
FIG. 2 illustrates the principle of operation of a biodetector according to the invention.

FIG. 2 shows the elements of the biodetector in a plane containing the axis Δ which is parallel to the directions G and D. The distance F defines a biodetection image capture plane, denoted P0 and perpendicular to the axis Δ. When the internal face of the finger 101 is approximately situated in the plane P0, the device 11 captures and records an image of the fingerprints which is in focus.

The projection systems 20 and 30 each comprise a projector 21, and respectively 31, and a mirror 23, respectively 33, which is disposed at the outlet of the corresponding system, on either side of the placement volume for the finger or for the hand of the user above the window 12. The two projectors 21 and 31 produce respective light beams F2 and F3, which are represented by their respective directions. The mirrors 23 and 33 respectively reflect beams F2 and F3 which, after reflection, can each form an angle in the range between 20 and 70 degrees, for example around 45 degrees, with the axis Δ. The beams F2 and F3 converge at a point situated at a distance e above the plane P0. When the finger 101 of the user 100 is in the correct position to allow a biodetection image to be captured which is in focus, the beams F2 and F3 converge on the upper side of the finger 101 forming the sign 40 which is visible to the user 100.

Figure 3A:
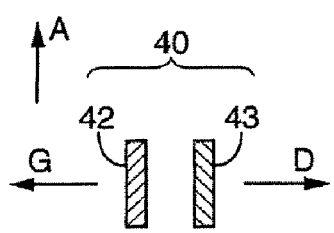
FIGS. 3a-3e show examples of visual signs which may be used in the biodetector in FIGS. 1 and 2.

By way of example, the sign 40 may be formed from two luminous lines parallel to the direction A, according to FIG. 3a. Each line is a component of the sign 40 which is projected by one of the systems 20 or 30. The line 42 may thus be projected by the system 20 and the line 43 may be projected by the system 30. The mirrors 23 and 33 may be oriented in such a manner that the sign 40 is formed at the distance e above the plane P0 by the superimposition of the two lines 42 and 43. According to one particular improvement, the beam F2 can be colored red and the beam F3 can be colored blue. Thus, when the finger 101 of the user 100 is too close to the part 10 of the biodetector, the red line 42 appears on the right of the blue line 43 on the upper side of the finger 101. Conversely, the red line 42 appears on the left of the blue line 43 on the upper side of the finger 101 when the finger is too far away from the part 10 (situation shown in FIG. 3a). When the finger 101 is at the correct distance from the part 10 of the biodetector, the two lines 42 and 43 are superimposed and form a single line of a violet color. It is thus possible for the user 100 to quickly judge if he is placing his finger at the correct height above the window 12 and to correct the height of the latter if necessary. The plane in which the two lines 42 and 43 appear superimposed on each other on the upper side of the finger 101 is referred to as locating plane and is denoted P1 in FIG. 2. The distance between the planes P0 and P1 then corresponds to the thickness of the finger 101. Preferably, the plane P0 is situated at a distance of less than 2 cm from the window 12.

Figure 3B:
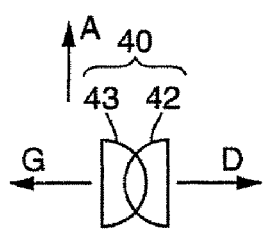
Figure 3C:
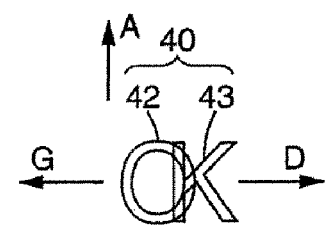
Figure 3D:
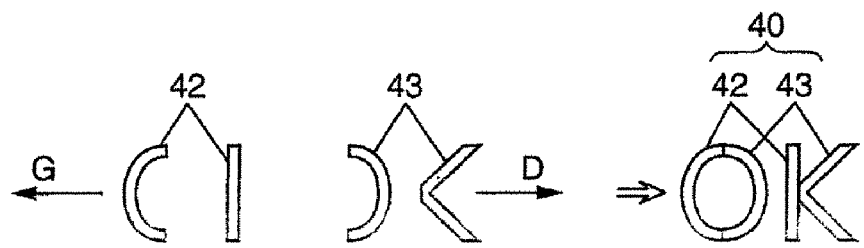
Figure 3E:
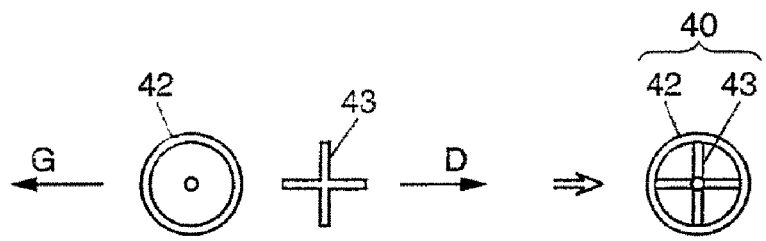

FIGS. 3b and 3c correspond to FIG. 3a, for visual signs in the form of a luminous disk or "OK" symbol. Each component 42, 43 of the sign 40 is a semi-disk cut parallel to the direction A in the first case, and is one of the two letters O or K in the second case. The correct height of the finger 101 above the window 12 is indicated by the juxtaposition of the two semi-disks to form a complete and regular disk, or by the juxtaposition of the two letters to form the indication "OK". According to another possibility, the letters O and K are each cut into two parts right and left, 42 and 43 respectively, and the correct height of the finger 101 is indicated by connecting, or abutting, the two parts of each letter (FIG. 3d). In yet another example of visual sign, the two components are respectively a circle 42 and a cross 43 designed to be brought to the center of the circle when the finger is moved toward the correct height above the window 12 (FIG. 3e).

Figures 4A, 4B:
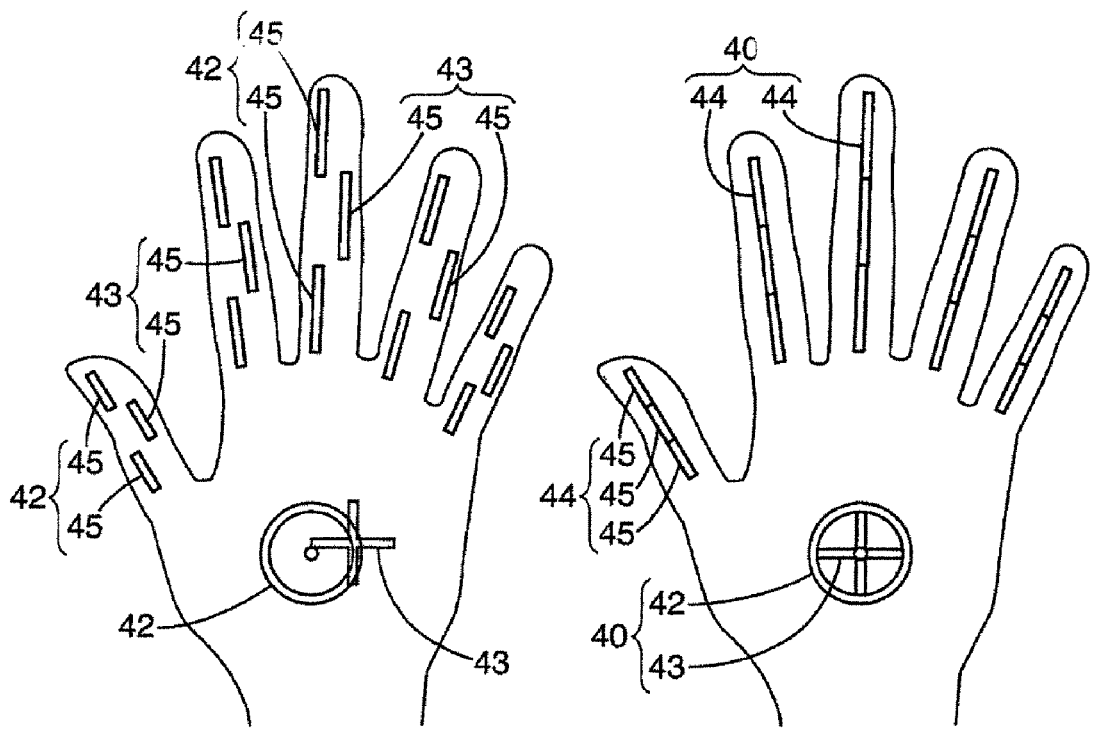
FIGS. 4a and 4b show an improvement of the invention for a biodetection based on an image of several fingers.

When the biodetection is based on characteristics of several fingers, such as is shown in FIGS. 4a and 4b, the visual sign 40 may comprise rectilinear segments 44 which each designate the location of a finger in the locating plane P1 and the direction of extension of the finger in this plane. Each segment 44 may itself be composed of several elementary segments 45 which belong to one or the other of the two components 42 and 43 of the visual sign 40. The elementary segments 45 of the same segment 44 then appear offset when the hand is not at the correct height above the window 12 (FIG. 4a) and aligned to form continuous segments 44 when the user 100 has placed his fingers at the correct height above the window 12 and when he has spread them out such that each segment 44 is projected onto a finger along the extension of the latter (FIG. 4b). Such components 42, 43 in the form of segments 44 designate the appropriate location of the fingers parallel to the window 12 more precisely.

Referring again to FIG. 2, the locating plane P1 may be displaced by varying the inclinations of the directions of projection of the two components of the sign 40. For this purpose, respective inclinations of the two orientable mirrors 23 and 33 are modified in such a manner as to symmetrically vary the inclinations of the beams F2 and F3 in a plane perpendicular to the image capture plane P0. In this way, the position of the recomposed visual sign 40 can be shifted along the axis Δ.

Stepper motors (not shown) may be used to simultaneously orient the mirrors 23 and 33, according to a continuous or discrete variation. When the orientations of the two mirrors are modified symmetrically, the locating plane P1 in which the visual sign 40 is recomposed is displaced along the axis Δ. In FIG. 2, P1' indicates a position of the locating plane which is shifted upward with respect to the position indicated by P1.

According to an alternative embodiment, the directions of the projection beams F2 and F3 may be varied by using facetted circular prisms. In a manner known to those skilled in the art, a circular prism has facets that are differently inclined in such a manner as to vary, by rotation of the prism, the inclination of an emerging beam produced from a fixed incident beam. Such prisms may be arranged in place of the mirrors 23 and 33.

Optionally, the distance between the locating plane and the image capture plane P0 could be adapted as a function of a dimension evaluated for the finger 101. This dimension may, for example, be a width 1 of the finger 101 parallel to the directions G and D. When the user 100 presents his finger for the first time above the window 12, at any distance from the latter, a first image of the finger is captured, for example by means of the device 11, which is then processed by a contour detection process. Such image analysis processes are assumed to be known to those skilled in the art. The width 1 of the finger 101 is thus evaluated and a thickness e of the finger is derived from this. The thickness e can be determined by using an empirical formula for converting between the width 1 of the finger and its thickness, or by using a stored correspondence curve. In general, the cross-section of the finger exhibits an oval shape, and the thickness e of the finger can be calculated from its width 1 by using a proportional relationship.

It is to be noted that the first image of the finger which is thus captured by the device 11 may be blurred, but it nevertheless enables the width of the finger 101 to be evaluated with a high enough precision.

Alternatively, for the first image for evaluating the width of the finger 101, the distance e between the planes P0 and P1 can be established according to a mean evaluation of the fingers or of the hands of a user population for which the biodetector is intended.

The mirrors 23 and 33 are then oriented in order to bring the locating plane to a distance from the image capture plane P0 equal to the thickness of the finger 101. Thus, the image capture plane P0 is fixed with respect to the part 10 of the biodetector, and the distance between the plane P0 and the locating plane is adjusted by moving the latter. In FIG. 2a, the references P1 and P1' correspond to two positions of the locating plane for a thin finger of thickness e and a thick finger of thickness e', respectively. When the locating plane is situated at a distance from the image capture plane P0 which is substantially equal to the thickness of the finger 101, a second image of the internal face of the finger is captured by the device 11. This second image is then sufficiently focused to make a recognition and/or an identification of the user 100 possible.

It will be understood that other visual devices for locating the height of a plane may be used, which are known to those skilled in the art. Generally speaking, such a device can be used in a biodetector according to the invention as long as it allows the height of a plane to be located with a precision greater than or substantially identical to the depth of field of the biodetection image formation device.

Furthermore, improvements to a biodetector according to the invention may be added with respect to the embodiments that have been described in detail hereinabove. Among these improvements, the following may be mentioned:

- the addition of a specific system for triggering the biodetection image capture. The biodetector may notably operate by automatic capture of images in continuous mode for as long as the presence of a finger is detected above the window 12, then by selection of one of the images which is sufficiently sharp and/or has a high enough resolution;
- an adaptation of the projectors 21 and 31, making it possible for the deformation of each component 42, 43 of the sign 40, caused by the inclination of the beams F2 and F3 with respect to the external face of the finger 101, to be reduced. For example, a pattern for each component 42, 43 which is illuminated inside the projector 21 or 31 may be inclined with respect to the corresponding direction of projection in order to compensate for the inclination of each beam F2, F3 with respect to the axis Δ in the locating plane P1. Such an adaptation of the projectors 21 and 31 may be necessary if the length of each component 42, 43 of the visual sign is significant. In particular, it is thus possible to design it so that the image capture plane P0 and the locating plane P1 form a gap W between them of variable thickness that corresponds to the thickness profile of the hand of the user 100, as shown in FIG. 5;
- the lens 13 of the biodetection image formation device 11 may be equipped with an autofocusing system in order to reduce the precision required in the positioning of the finger above the part 10 of the biodetector. In this case, the image capture plane P0 can be moved according to the thickness of the finger instead of, or in combination with, an adjustment of the position of the locating plane P1;
- an image processing system may be associated with the biodetector, which allows the quality of the biodetection image recorded to be improved. The use of such an image processing system may be preferable to that of an autofocusing system, notably since it does not require any mobile parts within the part 10 of the biodetector;
- the biodetector may comprise a telemetry system designed for determining the distance between the hand or the finger 101 and the device 11, and for controlling a displacement of the locating plane P1 along the axis Δ in order to allow the user to place his hand or his finger at the correct distance from the window 12. Alternatively, the telemetry system can be designed for controlling an adjustment of the autofocusing system;
- the matrix of photodetectors 14 may be replaced by a linear array of photodetectors. In this case, the user 100 must move his hand or his finger in the field of the device 11 in order to allow the biodetection image to be captured progressively during the passage of the internal face of the hand or of the finger perpendicularly to the direction of the linear array. When such a linear array of photodetectors is used, the optical assembly may be different, notably when each photodetector is equipped with its own optical, or micro-optical, system. The biodetection image formation device 11 is then adapted, in a manner known to those skilled in the art, so that the image capture plane P0 is again situated a few millimeters above the window 12;

the visual sign 40 may have a large dimension in the direction A, in order to encourage the user 100 to place his hand or his finger parallel to the window 12 opening it out in a suitable manner. In this way, a larger part of the internal face of the hand or of the finger will be situated at a distance from the biodetection image capture plane that is less than the depth of field;

a main visual sign may be projected onto the back of the hand and, simultaneously, secondary visual signs may be projected onto several fingers, aside from the thumb, in order to encourage the user to open his hand out completely and to present it with an appropriate inclination within the placement volume for the hand; and the device 11 may have a sufficient depth of field for the image of the internal face of the finger 101 to be in focus while keeping both the image capture plane P0 and the locating plane fixed, irrespective of the thickness of the finger of the user. Such a depth of field may be obtained, in a known manner, by adjusting parameters such as the sensitivity of the detector 14, the illumination and the size of the opening of the lens 13.

Lastly, the biodetector according to the invention may be designed to allow detection of the hand, a part of the hand or of one or more fingers of the user, depending on the biological parameters on which the recognition and/or the identification of the user are based.

The invention claimed is:

1. A biodetetector making it possible for an image of a hand or of at least one finger of a user to be recorded, and comprising:
   a biodetection image formation device, designed for recording said image when a first face of the hand or of the finger is placed substantially within a portion of an image capture plane,
   characterized in that said portion of image capture plane is situated within a placement volume for the hand or for the finger devoid of any contact surface, and in that the biodetector also comprises:
   a device for projecting two components of a visual sign, designed so that said sign is recomposed from said components in a locating plane substantially parallel to the image capture plane, said locating plane being situated, when the biodetection image is formed, at a distance from the image capture plane such that the recomposed sign is visible on a second face of the hand or of the finger opposite said first face.

2. The biodetector as claimed in claim 1, characterized in that the image capture plane is situated at a distance of less than 2 cm from a transparent window situated in front of the biodetection image formation device.

3. The biodetector as claimed in claim 1, characterized in that it also comprises a system for adjusting the distance between the image capture plane and the locating plane, said distance being adjusted as a function of a dimension of the hand or of the finger of the user.

4. The biodetector as claimed in claim 3, in which the dimension of the hand or of the finger of the user comprises a width of said hand or finger in a direction parallel to the image capture plane.

5. The biodetector as claimed in claim 4, designed so that the width of the hand or finger is evaluated based on a preliminary image formed by the biodetection image formation device.

6. The biodetector as claimed in claim 3, in which the image capture plane is fixed, and the distance between said image capture plane and the locating plane is adjusted by displacement of said locating plane.

7. The biodetector as claimed in claim 1, in which the device for projection of the two components of the visual sign comprises two projection systems designed for respectively projecting said components toward a region of the locating plane in which the visual sign is recomposed, respective projection directions of said systems being oblique with respect to a direction (Δ) perpendicular to the image capture plane, and intersecting at a point of said locating plane.

8. The biodetector as claimed in claim 6, designed so that the locating plane can be displaced by symmetrically varying respective inclinations of the directions of projection of the two components of the visual sign in a plane perpendicular to the image capture plane.

9. The biodetector as claimed in claim 8, comprising two orientable mirrors arranged in order to modify the respective inclinations of the directions of projection of the two components of the visual sign.

10. The biodetector as claimed in claim 8, comprising two facetted circular prisms arranged in order to modify the respective inclinations of the directions of projection of the two components of the visual sign.

11. The biodetector as claimed in claim 1, in which the recomposition of the visual sign comprises a superimposition of the two components, a mutual complementarity or a mutual connection of the two components.

12. The biodetector as claimed in claim 1, in which the recomposed visual sign comprises a pictogram, a geometrical pattern, at least one letter and/or a representation of at least a part of the hand or of the finger.

13. The biodetector as claimed in claim 1, in which the image capture plane and the locating plane form between them a gap of variable thickness corresponding to a thickness profile of the hand of the user.

14. The biodetector as claimed in claim 1, in which the visual sign comprises a main visual sign designed to be projected onto the back of the hand of the user and secondary visual signs designed to be projected onto several fingers of said hand.

15. The biodetector as claimed in claim 1, also comprising an image processing system designed for improving a quality of the recorded biodetection image.

16. The biodetector as claimed in claim 1, also comprising a telemetry system designed for determining a distance between the hand or the finger of the user and the biodetection image formation device, and for controlling a displacement of the locating plane in a direction perpendicular to the image capture plane (Δ).

17. The biodetector as claimed in claim 1, in which the biodetection image formation device comprises an autofocusing system, the biodetector also comprising a telemetry system designed for determining a distance between the hand or the finger of the user and the biodetection image formation device, and for controlling an adjustment of the autofocusing system.

18. A biodetection method, implemented by using a biodetector as claimed in claim 1.

19. The method as claimed in claim 18, comprising the following steps:
   /a/ by the user, placing a hand or a finger in a field of the biodetection image formation device;
   /b/ projecting, onto the hand or the finger of the user, on a side opposite the biodetection image formation device, the two components of the visual sign; and
   /c/ by the user, modifying a height or his hand or of his finger in front of the biodetection image formation device until the visual sign appears recomposed on a face of said hand or finger opposite the biodetection image formation device.

20. The method as claimed in claim 19, also comprising the following step, carried out in between the steps /a/ and /b/:

/a1/ adjusting a distance between the image capture plane and the locating plane as a function of a dimension of the hand or of the finger of the user.

21. The method as claimed in claim 20, in which said dimension comprises a width of the hand or of the finger, in a direction parallel to the image capture plane, the method also comprising the following steps, carried out in between the steps /a/ and /a1/:

/a11/ forming a preliminary image of the hand or of the finger of the user by means of the biodetection image formation device;

/a12/ evaluating, from said preliminary image, the width of the hand or of the finger; and /a13/ deriving from said width a thickness value of the hand or of the finger of the user, the distance between the image capture plane and the locating plane being adjusted in step /a1/ to the value of the thickness of the hand or of the finger of the user deduced in step /a13/.

* * * * *